US012624826B1

(12) United States Patent
Jeffery et al.

(10) Patent No.: US 12,624,826 B1
(45) Date of Patent: May 12, 2026

(54) ADAPTIVE OPTICAL OBFUSCATION SYSTEM FOR BLOCKING ELECTRONIC DETECTION AND PROVIDING VISUAL CONCEALMENT

(71) Applicants: Eric Jeffery, Elizabeth, CO (US);
Dennis Roark, Monument, CO (US)

(72) Inventors: Eric Jeffery, Elizabeth, CO (US);
Dennis Roark, Monument, CO (US)

( * ) Notice: Subject to any disclaimer, the term of this patent is extended or adjusted under 35 U.S.C. 154(b) by 0 days.

(21) Appl. No.: 19/349,008

(22) Filed: Oct. 3, 2025

(51) Int. Cl.
| | |
|---|---|
| *F21V 33/00* | (2006.01) |
| *F21V 23/04* | (2006.01) |
| *F21Y 113/10* | (2016.01) |
| *F21Y 115/10* | (2016.01) |
| *H04N 1/44* | (2006.01) |

(52) U.S. Cl.
CPC ...... *F21V 33/0008* (2013.01); *F21V 23/0414* (2013.01); *F21V 23/0435* (2013.01); *H04N 1/448* (2013.01); *F21Y 2113/10* (2016.08); *F21Y 2115/10* (2016.08)

(58) Field of Classification Search
CPC .... H04N 1/448; H04N 23/56; H04L 2209/16; F21V 33/0008; F21V 23/0414; F21V 23/0435; F21Y 2113/10; F21Y 2115/10
See application file for complete search history.

(56) References Cited

U.S. PATENT DOCUMENTS

| | | | |
|---|---|---|---|
| 8,816,306 B2* | 8/2014 | Yano, Jr. | F21V 29/70 250/493.1 |
| 9,247,238 B2 | 1/2016 | Izadi et al. | |
| 9,380,225 B2 | 6/2016 | Tiscareno et al. | |
| 10,178,741 B1 | 1/2019 | Shah et al. | |
| 11,321,487 B2 | 5/2022 | Kwatra et al. | |
| 2012/0274983 A1 | 11/2012 | Atsumi et al. | |
| 2017/0093228 A1* | 3/2017 | Fisher | H02J 7/35 |
| 2020/0358925 A1* | 11/2020 | Hall | H04N 7/181 |
| 2021/0067694 A1 | 3/2021 | Alshurafa et al. | |
| 2022/0120906 A1* | 4/2022 | Pacala | H03K 3/42 |

* cited by examiner

*Primary Examiner* — Hibret A Woldekidan
(74) *Attorney, Agent, or Firm* — Master Key IP, LLP; Justin G. Sanders

(57) ABSTRACT

An adaptive optical obfuscation system is disclosed and configured for blocking electronic detection and providing visual concealment for at least one object relative to at least one image sensor. In at least one embodiment, at least one obfuscation device is positioned between the at least one object and the at least one image sensor. The at least one obfuscation device provides at least one light emitter that emits a light emission at a wavelength that creates a controlled optical interference field preventing the at least one image sensor from accurately capturing an image of the at least one object. A microcontroller is in electrical communication with the at least one light emitter for controlling the at least one light emitter, and a power source is in electrical communication with each of the at least one light emitter and microcontroller.

20 Claims, 9 Drawing Sheets

ADAPTIVE OPTICAL OBFUSCATION SYSTEM FOR BLOCKING ELECTRONIC DETECTION AND PROVIDING VISUAL CONCEALMENT

RELATED APPLICATIONS

Not applicable.

BACKGROUND

The subject of this patent application relates generally to optics, and more particularly to an adaptive optical obfuscation system configured for blocking electronic detection and providing visual concealment from image sensors.

Applicant(s) hereby incorporate herein by reference any and all patents and published patent applications cited or referred to in this application.

By way of background, digital cameras have proliferated throughout society and are available as standalone devices— including municipal, commercial, and residential surveillance cameras—as well as components on many other devices, such as smartphones, wearables, vehicles and the like. As a result, the number of digital images being captured by these cameras—often without consent—has exploded in recent years which, in turn, has significantly eroded individual and organizational privacy. Known existing privacy solutions are primarily software-based and reactive (e.g., image blurring or facial masking in post-processing after digital images have already been captured by cameras), offering little to no protection against real-time image capture. Furthermore, given that such solutions require access to or the cooperation of the owners of such cameras (in order to perform the post-processing on any captured images), those known solutions fail to enable individuals to effectively shield themselves from being photographed or video recorded without their consent. Accordingly, there remains a need for a proactive, hardware-based solution that can prevent image acquisition altogether and provide individuals with autonomy over their visual privacy without causing physical harm to the cameras or violating safety standards.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing an adaptive optical obfuscation system configured for blocking electronic detection and providing visual concealment for an at least one object relative to an at least one image sensor. In at least one embodiment, an at least one obfuscation device is positioned between the at least one object and the at least one image sensor. The at least one obfuscation device provides an at least one light emitter that emits a light emission at a wavelength that approximates a corresponding wavelength utilized by the at least one image sensor so as to create a controlled optical interference field that prevents the at least one image sensor from accurately capturing an image of the at least one light emitter or the at least one object. An at least one microcontroller is in electrical communication with the at least one light emitter for controlling the at least one light emitter. An at least one power source is in electrical communication with each of the at least one light emitter and microcontroller for selectively powering each of the at least one light emitter and microcontroller. During use, the at least one obfuscation device is oriented such that the light emission of the at least one light emitter is directed at one or both of the at least one image sensor and the at least one object. Accordingly, individuals or objects are capable of preventing visual detection by cameras before any data is collected.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
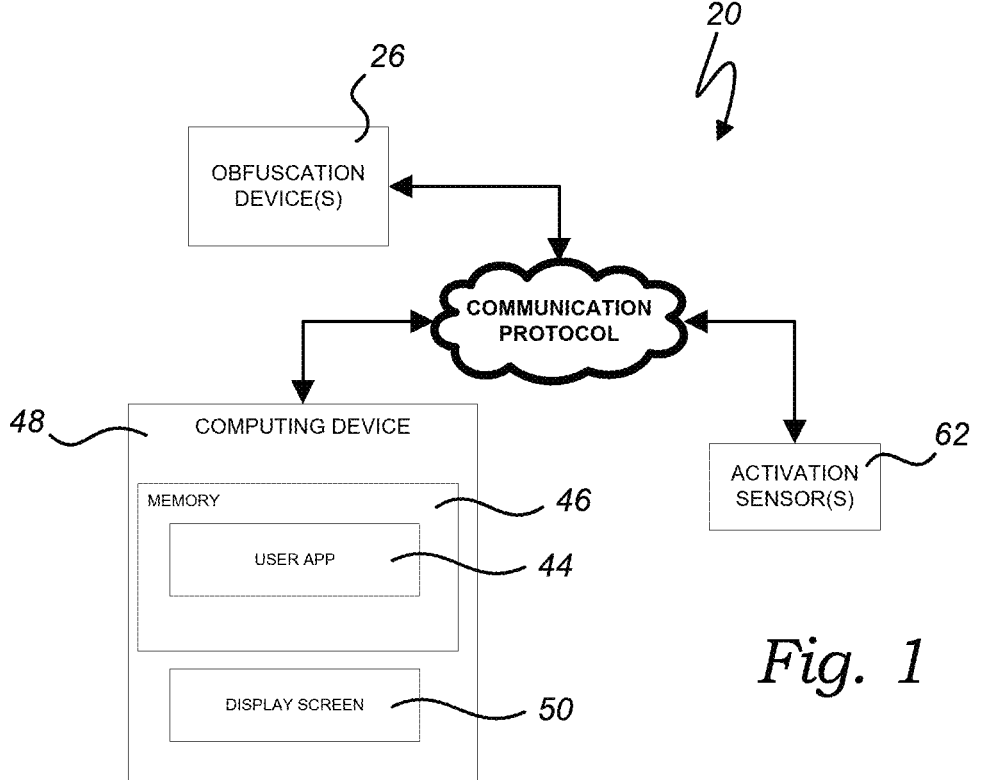
FIG. 1 is a simplified schematic view of an exemplary adaptive optical obfuscation system, in accordance with at least one embodiment.

Turning now to FIG. 1, there is shown a simplified schematic view of an exemplary adaptive optical obfuscation system 20 configured for blocking electronic detection and providing visual concealment for an at least one object 22 relative to an at least one image sensor 24. At the outset, it should be noted that while the system 20 is shown and described in the context of select exemplary embodiments and corresponding use cases for illustrative purposes, the system 20 should not be read as being so limited. Instead, in further embodiments, the system 20 and its associated components described herein may be configured for use in virtually any context where there is a need for blocking electronic detection and providing visual concealment for an at least one object 22 relative to an at least one image sensor 24—not just with respect to concealing individuals' identities, but in any context where it is desired to visually obscure one or more objects 22 (living or non-living, stationary or moving) from one or more image sensors 24 (stationary or moving). Accordingly, for simplicity purposes, the term "object" will be used herein to generally include any type of object 22, living or non-living, stationary or moving, now known or later developed, even though select types of objects 22 may be shown and described herein for illustrative purposes. Furthermore, while select types of image sensors 24 may be shown and described herein for illustrative purposes, it is intended that the phrase "image sensor" generally include any and all types of image sensors 24, stationary or moving, now known or later developed—including but in no way limited to those that are incorporated into digital cameras, smartphone cameras, wearable cameras, computer cameras, laptop cameras, tablet cameras, vehicle cameras, municipal surveillance cameras, commercial surveillance cameras, residential surveillance cameras, etc.

Figure 2:
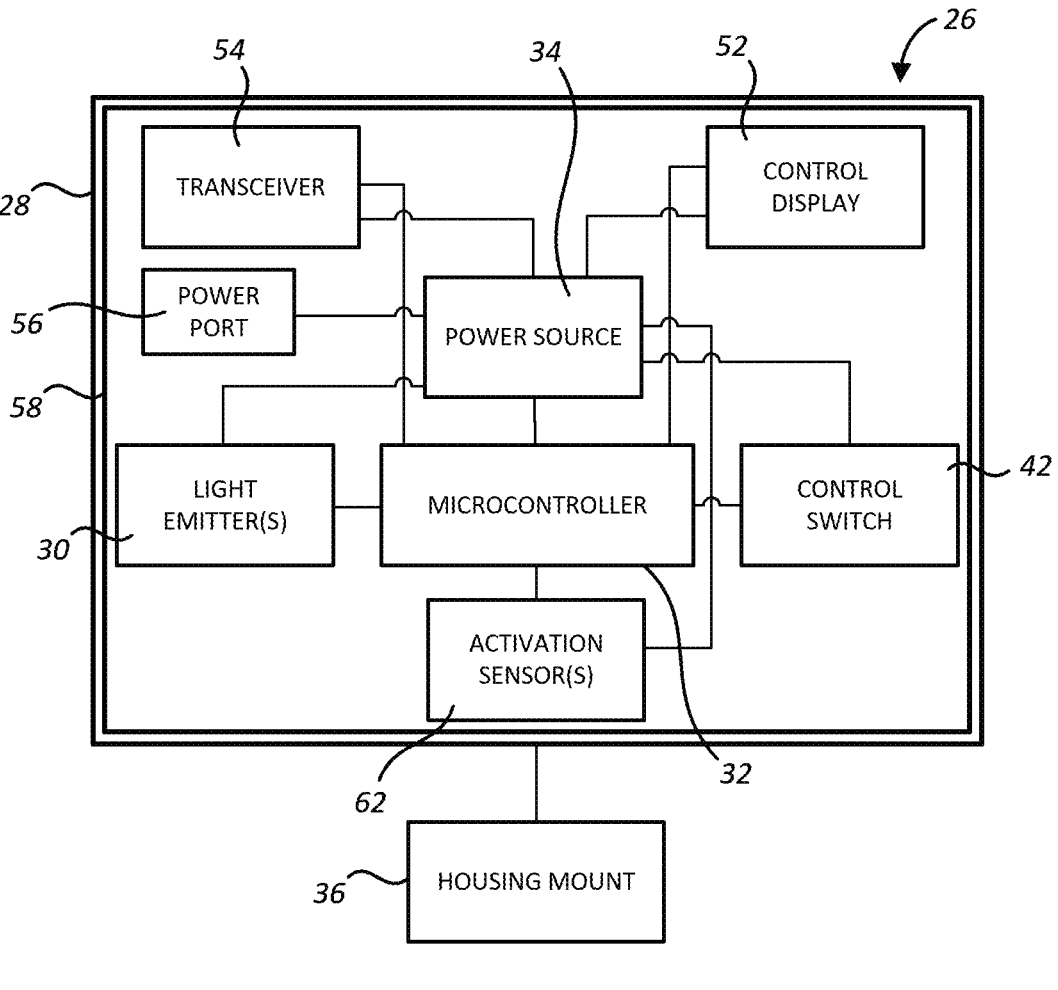
FIG. 2 is a simplified schematic view of an exemplary obfuscation device of the system, in accordance with at least one embodiment.

In at least one embodiment, as best illustrated in FIG. 2, the system 20 provides an at least one obfuscation device 26 comprising a device housing 28 sized and configured for containing an at least one light emitter 30, an at least one microcontroller 32 in electrical communication with the at least one light emitter 30, an at least one power source 34 in electrical communication with each of the at least one light emitter 30 and microcontroller 32, and an at least one housing mount 36 positioned and configured for attaching the device housing 28 to a desired location relative to the at least one object 22. As discussed in greater detail below, in at least one embodiment, the at least one obfuscation device 26 is positioned between the at least one object 22 and the at least one image sensor 24, such that the at least one light emitter 30 is directed substantially toward the at least one image sensor 24 or, alternatively, substantially toward the at least one object 22.

In at least one embodiment, the at least one light emitter 30 is configured for emitting a light emission at a wavelength that approximates a corresponding wavelength utilized by the at least one image sensor 24 so as to create a controlled optical interference field that prevents the at least one image sensor 24 from accurately capturing an image of the at least one light emitter 30 or the at least one object 22. In at least one embodiment, the at least one light emitter 30 provides an at least one infrared light source (such as one or more LED's, for example) configured for emitting an infrared light at wavelengths that are undetectable by the human eye yet align with or closely approximate those used by the at least one image sensor 24, which floods the at least one image sensor 24 and creates a controlled optical interference field that prevents the accurate acquisition of visual data by obstructing image resolution at the sensor level. As a result, the at least one light emitter 30 is able to optically interfere with the at least one image sensor 24, effectively rendering the at least one object 22 undetectable, or at least unidentifiable. Furthermore, the at least one light emitter 30 does not damage or permanently alter the at least one image sensor 24—instead, when the at least one light emitter 30 is subsequently deactivated, the environment returns to normal visibility to the impacted at least one image sensor 24, supporting safe and ethical use in shared or temporary-use environments.

Figure 3A:
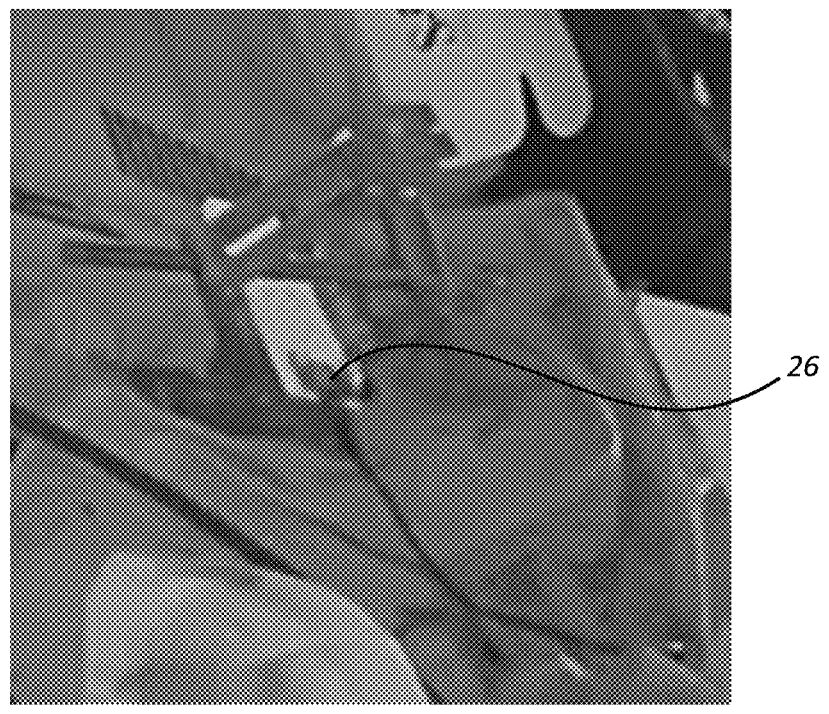
FIGS. 3A and 3B are images of an exemplary obfuscation device of the system in use, as captured by an exemplary image sensor, in accordance with at least one embodiment.

In at least one embodiment, the at least one light emitter 30 is configured for emitting an infrared light having a wavelength between approximately 700 nanometers and approximately 1 millimeter (i.e., at or near the wavelength used by the at least one image sensor 24), which is capable of saturating—either directly or indirectly, as discussed further below—any near-infrared sensors that might be utilized by low-light or night vision image sensors 24, thereby disrupting or obscuring any image of the at least one light emitter 30—along with an area immediately surrounding the at least one light emitter 30—that might be captured by such image sensors 24, as illustrated in FIGS. 3A (wherein the at least one light emitter 30 is not active) and 3B (wherein the at least one light emitter 30 is active). In at least one such embodiment, the at least one light emitter 30 is configured for emitting an infrared light having a wavelength of 780 nanometers, or 850 nanometers, or 940 nanometers. In at least one alternate embodiment, the at least one light emitter 30 provides an at least one ultraviolet light source (such as one or more LED's, for example) configured for emitting an ultraviolet light having a wavelength between approximately 100 nanometers and approximately 400 nanometers, which is capable of confusing or blinding any short-wavelength sensors that might be utilized by image sensors 24, in addition to disrupting ultraviolet-reactive materials in some biometric and forensic imaging systems. In at least one such embodiment, the at least one light emitter 30 is configured for emitting an ultraviolet light having a wavelength of between approximately 365 nanometers and approximately 405 nanometers. In still further embodiments, the at least one light emitter 30 may provide a combination of infrared and ultraviolet light sources—including multiple infrared light sources and/or multiple ultraviolet light sources operating at the same or different wavelengths, and operating either simultaneously or in one or more pre-defined patterns—to address a wider range of image sensors 24. In at least one embodiment, the at least one light emitter 30 further provides an at least one mid-infrared light source and/or a blackbody radiation source configured for confusing thermal-based image sensors 24, depending on heat management needs.

Figure 6:
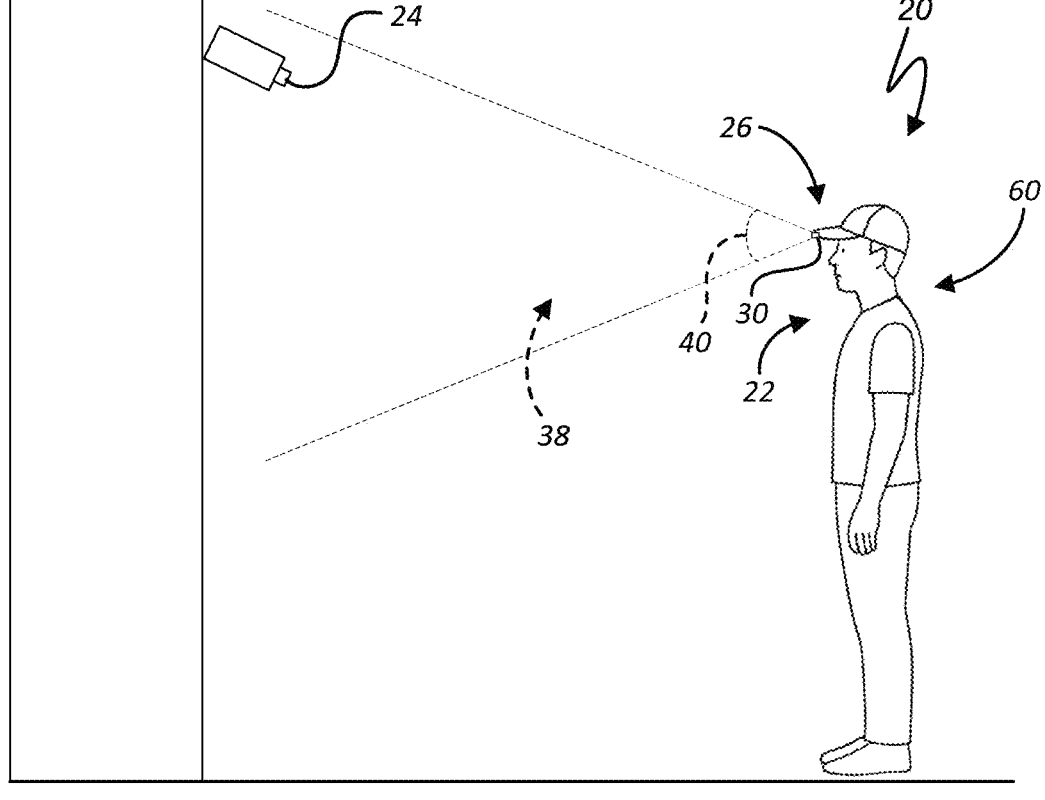
FIG. 6 is a diagrammatic side view of the system of FIGS. 4 and 5 in use, in accordance with at least one embodiment.
Figure 9:
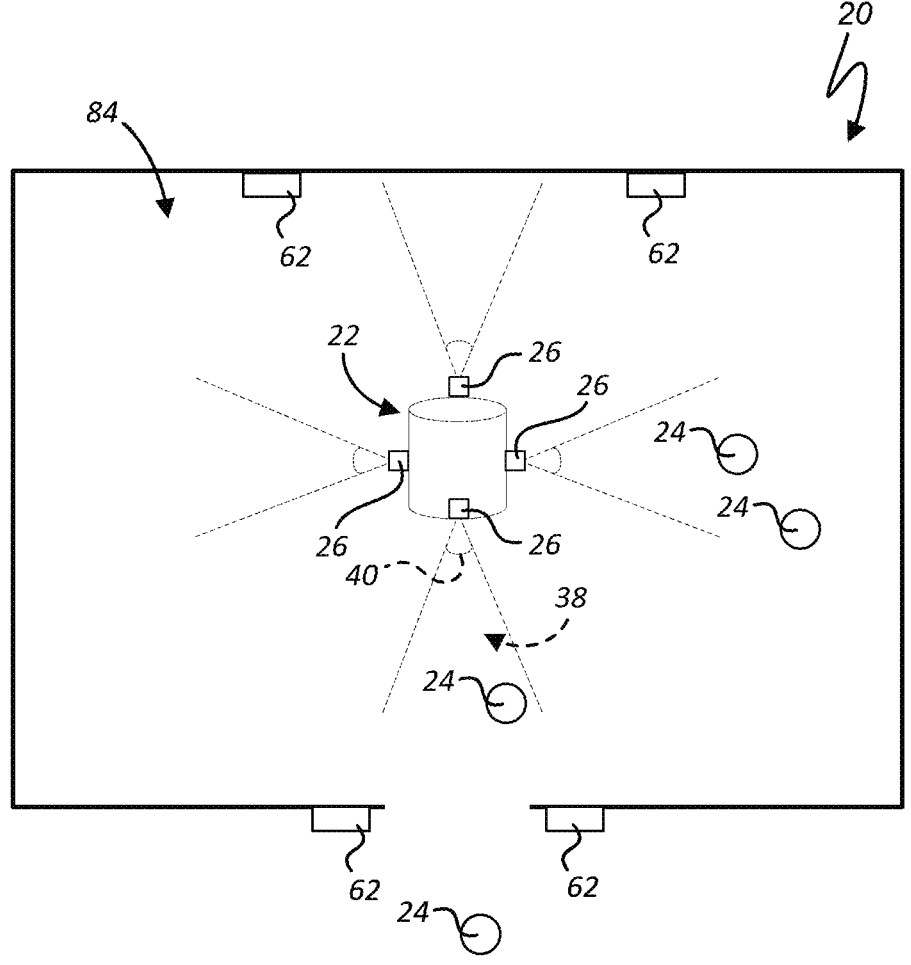
FIG. 9 is a diagrammatic plan view of a still further exemplary adaptive optical obfuscation system integrated with an exemplary museum exhibit in use, in accordance with at least one embodiment.
Figure 10:
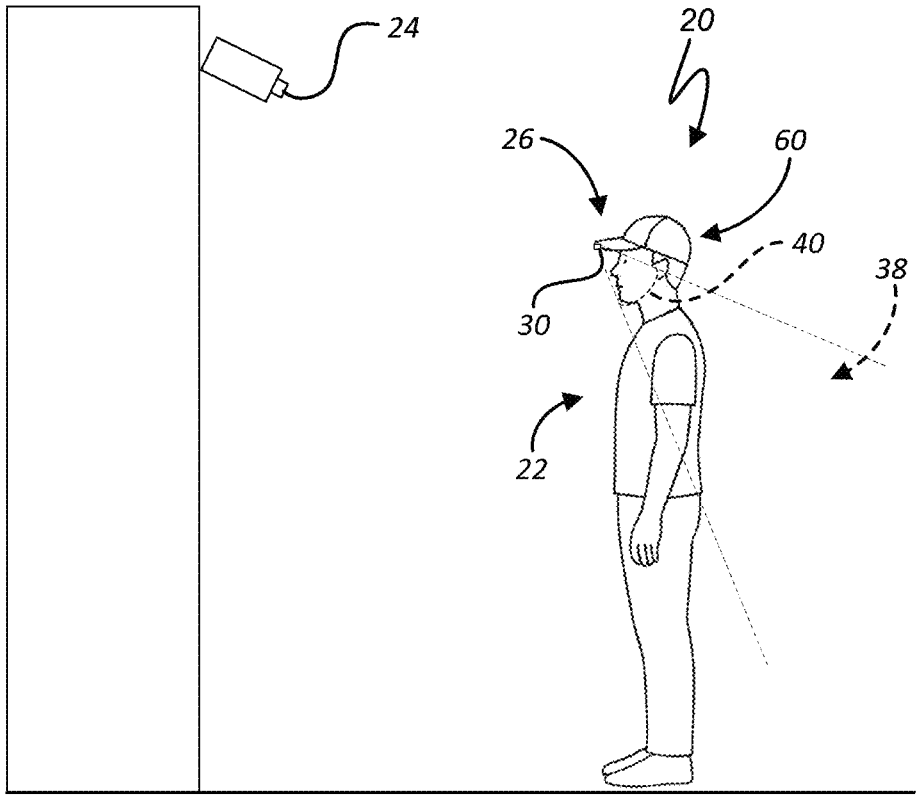
FIG. 10 is a diagrammatic side view of an alternate exemplary embodiment of the system of FIGS. 4 and 5 in use, in accordance with at least one embodiment.

In at least one embodiment, the at least one light emitter 30 is further configured for emitting infrared light in a desired direction—i.e., directed at one or both of the at least one image sensor 24 (FIGS. 6, 8 and 9) and the at least one object 22 (FIG. 10). In at least one such embodiment, as illustrated best in FIGS. 6 and 8, the at least one light emitter 30 emits the directed infrared light as a substantially cone-shaped emission field 38, with the emission field 38 having an emission angle 40 ranging between approximately 30 degrees and approximately 120 degrees—however, in further embodiments, the emission angle 40 may be less than 30 degrees or greater than 120 degrees. In at least one embodiment, a narrower emission angle 40 (e.g., approximately 30 degrees to approximately 60 degrees) may be used for targeted disruption—such as when a specific image sensor 24 is detected by the system 20 (as discussed further below), in order to focus infrared energy on the lens of the image sensor 24 and minimize power consumption—while a wider emission angle 40 (e.g., approximately 90 degrees to approximately 120 degrees) may be used for broad-area coverage in high-surveillance environments, such as public spaces. In at least one alternate embodiment, where the at least one light emitter 30 is directed at the at least one object 22, the emission angle 40 may be set so that the emission field 38 sufficiently covers the at least one object 22—based, at least in part, on the distance between the at least one light emitter 30 and the at least one object 22, along with the size of the at least one object 22. In at least one embodiment, the at least one light emitter 30 is configured for allowing selective adjustment of the emission angle 40. In at least one such embodiment, the at least one light emitter 30 provides a micro-lens array or a collimator to dynamically adjust the emission angle 40. In further such embodiments, any other mechanism or technique for dynamically adjusting the emission angle 40 of the at least one light emitter 30 may be utilized. In at least one embodiment, the at least one obfuscation device 26 provides multiple light emitters 30 arranged so as to cooperate with one another to provide a relatively larger emission field 38. For example, in embodiments where the at least one obfuscation device 26 is worn by or otherwise mounted on the object 22, the light emitters may be arranged so as to provide a combined emission field 38 having a total emission angle 40 of 360 degrees about the object 22. In at least one alternate embodiment, a relatively larger emission field 38 may be achieved using multiple obfuscation devices 26 strategically arranged relative to the object 22, with each obfuscation device 26 providing one or more light emitters 30.

Figure 3B:
Figures 4, 5:
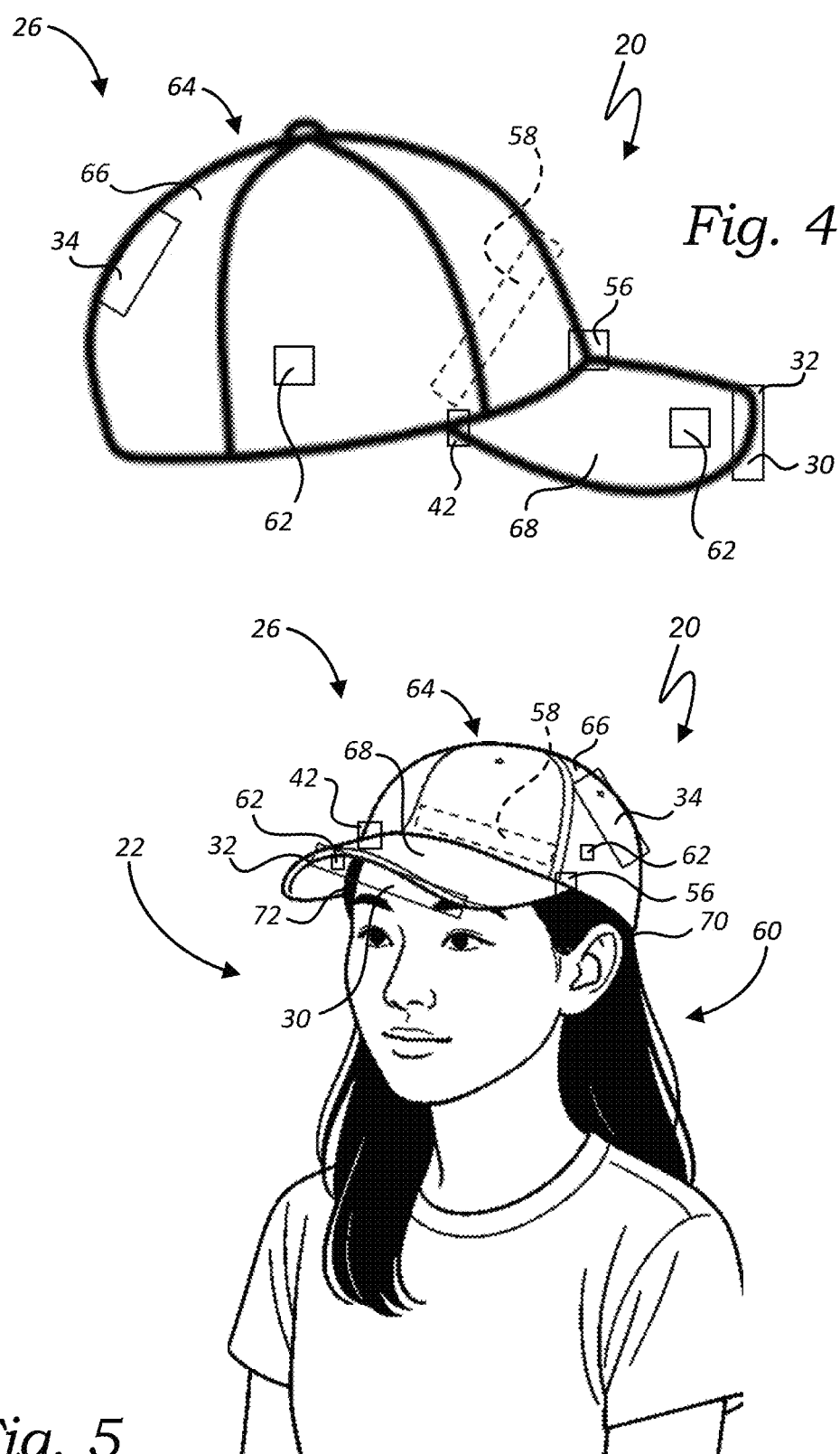
FIGS. 4 and 5 are diagrammatic perspective views of an exemplary adaptive optical obfuscation system integrated with an exemplary article of clothing, in accordance with at least one embodiment.

Thus, in at least one embodiment, by emitting infrared light at or near the wavelength used by the at least one image sensor 24, the at least one obfuscation device 26 introduces optical interference that prevents accurate image formation—either by directing the light emission of the at least one light emitter 30 at the at least one image sensor 24 (such that the light emission directly floods the at least one image sensor 24 and creates a controlled optical interference field that prevents the accurate acquisition of visual data by obstructing image resolution at the sensor level), or by directing the light emission of the at least one light emitter 30 at the at least one object 22 (such that the at least one object 22 itself is flooded by the light emission which, in turn, reflects and refracts back toward the at least one image sensor 24 so as to create a controlled optical interference field that prevents the accurate acquisition of visual data by obstructing image resolution at the sensor level), or both. To the at least one image sensor 24, the at least one object 22 appears as a field of bright or oversaturated light (FIG. 3B)—effectively concealing shape, color, and identity of the at least one object 22. In at least one embodiment, as discussed further below, the system 20 can be configured to scale its infrared emission based on the size and movement of the at least one object 22, enabling fixed or mobile deployment in both personal privacy and tactical field applications.

In at least one embodiment, the at least one microcontroller 32 is configured for controlling the at least one light emitter 30, including selectively activating and deactivating the at least one light emitter 30, and controlling any pre-defined pulse patterns to be followed by the at least one light emitter 30. In at least one embodiment, the at least one microcontroller 32 and at least one light emitter 30 are positioned on one or more printed circuit boards. In at least one such embodiment, one or more of the printed circuit boards are rigid for structured form factors. In at least one alternate such embodiment, one or more of the printed circuit boards are flexible for curved or wearable form factors. In at least one embodiment, the at least one microcontroller 32 is in electrical communication with an at least one control switch 42 configured for allowing a user to selectively power the corresponding obfuscation device 26 on and off, and/or selectively cycle the at least one light emitter 30 through different light emitter 30 combinations, modes, and/or pre-defined pulse patterns. In at least one embodiment, with the at least one light emitter 30 operating in a pre-defined pulse pattern, the obfuscation device 26 is able to reduce power consumption, pulse at specific frequencies (e.g., 10-60 Hz) that are tailored to interfere with any rolling shutter and/or sensor sampling rates of the at least one image sensor 24, and lower detectability of the obfuscation device 26 by making the light emissions harder to perceive with the naked eye or through casual inspection. In at least one embodiment, the at least one microcontroller 32 is further configured for selectively adjusting an emission intensity of the directed infrared light of the at least one light emitter 30, based on one of both of ambient light conditions and a distance between the object 22 and the image sensor 24. For example, in low-light environments, lower-intensity pulses are sufficient to overwhelm night-vision image sensors 24, while daylight conditions may require higher intensity to compete with ambient infrared noise. In at least one such embodiment, the emission intensity of the infrared light ranges between approximately 100 mW/sr and approximately 1 W/sr—however, in further embodiments, the emission intensity may be less than 100 mW/sr or greater than 1 W/sr.

In at least one further embodiment, the at least one microcontroller 32 is in selective communication with a user application 44 residing locally in memory 46 on a computing device 48 (for example, as a standalone application on the computing device 48), with the user application 44 being configured for selectively communicating with the microcontroller 32 to selectively power the corresponding obfuscation device 26 on and off, and/or selectively cycle the at least one light emitter 30 through different light emitter 30 combinations, modes, and/or pre-defined pulse patterns. It should be noted that, for simplicity purposes, the terms "computing device" and "user application" as used herein are intended to be interchangeable. In at least one embodiment, the computing device 48 provides an at least one display screen 50 for providing an at least one graphical user interface to assist the associated user with accessing and utilizing the various functions provided by the at least one microcontroller 32. In at least one further embodiment, the at least one obfuscation device 26 itself provides an at least one control display 52 for providing an at least one graphical user interface to assist the associated user with accessing and utilizing the various functions provided by the at least one microcontroller 32. In at least one alternate embodiment, the at least one control display 52 comprises one or more indicator lights. It should also be noted that the term "memory" is intended to include any type of electronic storage medium (or combination of storage mediums) now known or later developed, such as local hard drives, RAM, flash memory, secure digital ("SD") cards, external storage devices, network or cloud storage devices, integrated circuits, etc., while the term "computing device" is intended to include any type of computing or electronic device, now known or later developed, capable of substantially carrying out the functionality described herein—such as desktop computers, mobile phones, smartphones, laptop computers, tablet computers, personal data assistants, gaming devices, wearable devices, etc. As such, the system 20 should not be read as being limited to use with any one particular type of computing or electronic device, even though certain exemplary devices may be mentioned or shown herein for illustrative purposes. Furthermore, communication between each of the computing device 48 and at least one microcontroller 32 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. In at least one embodiment, the at least one obfuscation device 26 provides a transceiver 54 in electrical communication with the at least one microcontroller 32, and in remote communication with the computing device 48. Similarly, in at least one embodiment, communications between each of the computing device 48 and at least one microcontroller 32 may be encrypted using any encryption method (or combination of methods) now known or later developed.

In at least one embodiment, the at least one power source 34 is configured for selectively powering each of the at least one light emitter 30 and microcontroller 32, along with any other components of the corresponding obfuscation device 26 described herein that might require power (e.g., transceiver 54, control display 52, control switch 42, etc.). In at least one embodiment, the at least one power source 34 is an at least one power storage device, such as a storage capacitor or battery (either rechargeable or non-rechargeable). In at least one such embodiment, the at least one power storage device is a 3.7V Li-Po or Li-Ion cell battery (e.g., 500-2000 mAh). In at least one alternate embodiment, the at least one power source 34 is an AC power supply or a DC power supply. In at least one embodiment, the printed circuit board provides a power port 56 (such as a USB type-A port, a USB type-C port or micro-USB port, for example) configured for selectively powering each of the at least one light emitter 30 and microcontroller 32 and further charging the at least one power source 34 (where the at least one power source 34 is a rechargeable battery). In further alternate embodiments, the at least one power source 34 may be any other type of power source 34 (now known or later developed) capable of providing the requisite power to each of the above-discussed components, so long as the obfuscation device 26 is capable of substantially carrying out the functionality described herein. In at least one still further alternate embodiment, the at least one power source 34 is located external to the device housing 28.

In at least one embodiment, the device housing 28 of the at least one obfuscation device 26 is relatively small and compact, while being configured for a corresponding use case in which the system 20 is to be utilized, as discussed further below. Thus, while certain exemplary embodiments of the device housing 28 are shown and described herein, in further embodiments, the device housing 28 and the various components contained therein may take on any other sizes, shapes, dimensions, quantities and/or configurations now known or later developed—dependent, at least in part, on the particular use case in which the system 20 is to be utilized, including the at least one object 22 to be obfuscated and the potential location of the at least one image sensor 24 relative to the at least one object 22—so long as the obfuscation device 26 is capable of substantially carrying out the functionality described herein. Additionally, in at least one embodiment (as discussed further below), the device housing 28 may be omitted altogether, with the various components described as being contained therein instead being individually mounted elsewhere on or near the at least one object 22.

In at least one embodiment, the at least one obfuscation device 26 further provides one or more thermal layers 58 positioned and configured for absorbing and dissipating any heat generated by the components of the obfuscation device 26 and, in select embodiments, protecting a wearer 60 of the obfuscation device 26 from said heat. In at least one such embodiment, where the obfuscation device 26 provides a device housing 28, the at least one thermal layer 58 is positioned within the device housing 28. In at least one alternate such embodiment, where the obfuscation device 26 does not provide a device housing 28, the at least one thermal layer 58 is positioned between the at least one light emitter 30 and the wearer 60 of the obfuscation device 26. In at least one embodiment, the at least one thermal layer 58 is constructed out of at least one of aluminum, copper, ceramic or carbon nano tubes. However, in further embodiments, the at least one thermal layer 58 may be constructed out of any other material, now known or later developed, capable of dissipating any heat generated by the components of the obfuscation device 26 and, in select embodiments, protecting a wearer 60 of the obfuscation device 26 from said heat. In at least one further embodiment, the device housing 28 itself is constructed out of at least one thermal layer 58.

Figure 8:
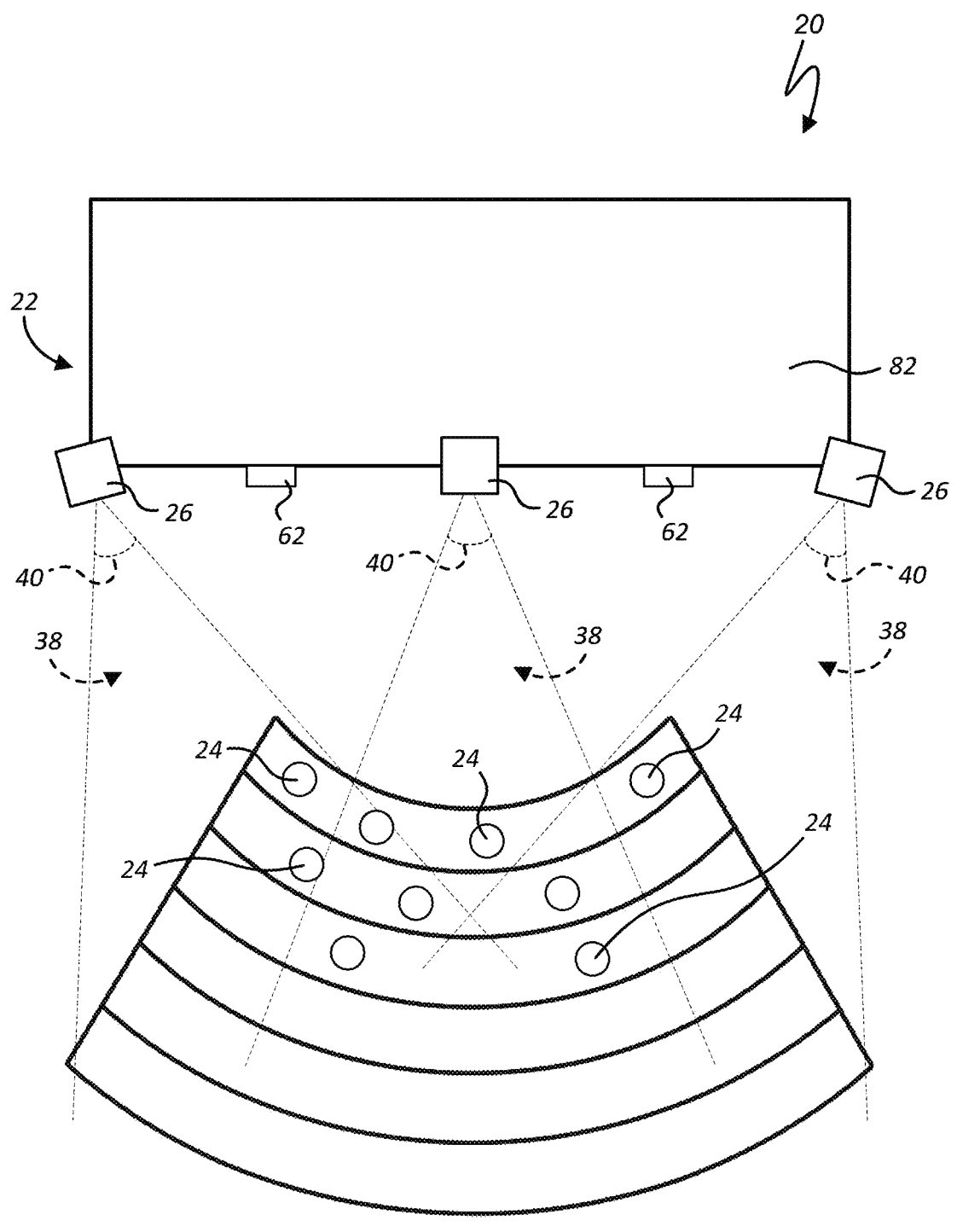
FIG. 8 is a diagrammatic plan view of a still further exemplary adaptive optical obfuscation system integrated with an exemplary performance stage in use, in accordance with at least one embodiment.

In at least one embodiment, the system 20 further provides an at least one activation sensor 62 in communication with the at least one microcontroller 32 and configured for assisting the microcontroller 32 with determining when to selectively power the corresponding at least one light emitter 30 on and off, and/or selectively cycle the at least one light emitter 30 through different light emitter 30 combinations, modes, and/or pre-defined pulse patterns. In at least one embodiment, as illustrated in FIG. 2, the at least one activation sensor 62 may be positioned on or within the device housing 28 of the at least one obfuscation device 26, in which case the at least one activation sensor 62 may be in direct electrical communication with the corresponding at least one microcontroller 32. In at least one alternate embodiment, as illustrated in FIGS. 8 and 9, the at least one activation sensor 62 may be positioned remote from the at least one obfuscation device 26, in which case the at least one activation sensor 62 may be in indirect wireless communication with the corresponding at least one microcontroller 32 (such as via the transceiver 54, for example). In at least one embodiment, the at least one activation sensor 62 is positioned and configured for detecting the potential presence of at least one image sensor 24 oriented in the direction of the at least one object 22, thereby better ensuring timely and precise activation of the at least one light emitter 30. In at least one such embodiment, the at least one activation sensor 62 is at least one of a photo sensor and a radio frequency ("RF") detector. In at least one such embodiment, the photo sensor employs photodiodes and/or quantum dot-based sensors to detect the presence of camera lenses by analyzing reflected light patterns. Lenses produce distinct specular reflections compared to other surfaces, allowing the photo sensor to identify potential image sensors 24 within a 5-20 meter range. In at least one such embodiment, the photodiodes are calibrated to detect glints from glass or plastic lenses, even in low-light conditions. In at least one embodiment, the RF detector identifies wireless signals commonly associated with camera-enabled devices, such as Wi-Fi or Bluetooth transmissions from smartphones, drones, or IP cameras. In at least one such embodiment, the system 20 uses a pre-trained machine learning model to differentiate camera-related RF signatures from other devices, thereby improving detection accuracy. In at least one embodiment, the at least one activation sensor 62 further provides a microbolometer-based thermal sensor (e.g., FLIR Lepton) configured for detecting subtle heat signatures emitted by active camera electronics, such as the processor or battery in smartphones or drones. This is particularly effective for identifying cameras in low-visibility conditions (e.g., night or fog) where photo sensors may be less reliable. In at least one further embodiment, where the at least one obfuscation device 26 is fixedly positioned relative to potentially moving image sensors 24 (for example, in a concert or theater environment, where the at least one obfuscation device 26 is positioned and configured for preventing attendees from capturing unauthorized photos or videos of the performers), the at least one activation sensor 62 may be a motion sensor configured for simply detecting movement in the vicinity proximal to the at least one obfuscation device 26, at which point the at least one light emitter 30 is activated by the corresponding at least one microcontroller 32. In still further embodiments, the at least one activation sensor 62 may be any other device or technique, now known or later developed, capable of detecting the potential presence of at least one image sensor 24 oriented in the direction of the at least one object 22.

In at least one embodiment, the at least one microcontroller 32 receives the signals from the at least one activation sensor 62 and utilizes a sensor fusion algorithm to better ensure robust image sensor 24 detection across diverse scenarios—from crowded urban environments to calmer, more controlled environments—while minimizing false positives. In at least one such embodiment, the algorithm entails photo sensors and RF detectors continuously monitoring for potential image sensor 24 signatures (e.g., lens reflections or Wi-Fi signals), and, upon detecting a potential image sensor 24 via the at least one activation sensor 62, the at least one microcontroller 32 initiates a pulsed light emission field 38 via the at least one light emitter 30 in the direction of the detected image sensor 24 and/or the at least one object 22, dynamically adjusting intensity and frequency based on the activation sensor 62 data and environmental conditions.

As mentioned above, in at least one embodiment, the device housing 28 provides an at least one housing mount 36 positioned and configured for attaching the device housing 28 to a desired location relative to the at least one object 22, so as to orient the at least one light emitter 30 in the general direction of the at least one image sensor 24 or the at least one object 22. Given that the system 20 and its associated components described herein may be configured for use in virtually any context where there is a need for blocking electronic detection and providing visual concealment for an at least one object 22 relative to an at least one image sensor 24—not just with respect to concealing individuals' identities, but in any context where it is desired to visually obscure one or more objects 22 from one or more image sensors 24—the device housing 28 and corresponding housing mount 36 may similarly take on any number of configurations, depending on the context in which the system 20 is to be utilized. The following non-limiting examples are provided for illustrative purposes only in order to facilitate a more complete understanding of representative embodiments now contemplated. These examples are intended to be a mere subset of all possible contexts in which the system 20 may be utilized.

By way of non-limiting examples, in at least one embodiment, where the at least one obfuscation device 26 is integrated into an article of clothing (such as a hat 64, as depicted in FIGS. 4-6 and 10)—such that the object 22 is the wearer 60 of the article of clothing, and the at least one image sensor 24 may be encountered by the wearer 60 as the wearer 60 moves throughout the surrounding environment—the at least one housing mount 36 may comprise clips, magnets, buttons, snaps, hook-and-loop material, adhesives, stitching, welding, etc. Similarly, in at least one embodiment where the device housing 28 is omitted, each of the components described herein may be mounted using clips, magnets, buttons, snaps, hook-and-loop material, adhesives, stitching, welding, etc. In further embodiments, the at least one housing mount 36 may utilize any other mechanisms, materials or techniques, now known or later developed—dependent, at least in part, on the particular use case in which the system 20 is to be utilized, including the at least one object 22 to be obfuscated and the potential location of the at least one image sensor 24 relative to the at least one object 22—so long as the obfuscation device 26 is capable of substantially carrying out the functionality described herein.

In at least one such embodiment, and by way of further example, with continued reference to FIGS. 4-6 and 10, where the at least one obfuscation device 26 is integrated into a hat 64, the at least one power source 34 may be positioned within a crown 66 of the hat 64, above a head 70 of the wearer 60, the power port 56 may be positioned on a side of the crown 66 for accessibility, the control switch 42 may be positioned near a brim 68 of the hat 64, the thermal layer 58 may be positioned between a forehead 72 of the wearer 60 and the at least one light emitter 30, the microcontroller 32 may be positioned on the brim 68 of the hat 64, the at least one activation sensor 62 may be positioned on the brim 68 or front of the hat 64 in a substantially forward facing direction, and the at least one light emitter 30 may be positioned on the brim 68 of the hat 64 in a forward facing direction so as to direct the light emission of the at least one light emitter 30 at the at least one image sensor 24 (FIG. 6) or a rearward facing direction so as to direct the light emission of the at least one light emitter 30 at the at least one object 22 (FIG. 10). However, in further such embodiments, one or more of the components may be positioned elsewhere on the hat 64.

Figure 7:
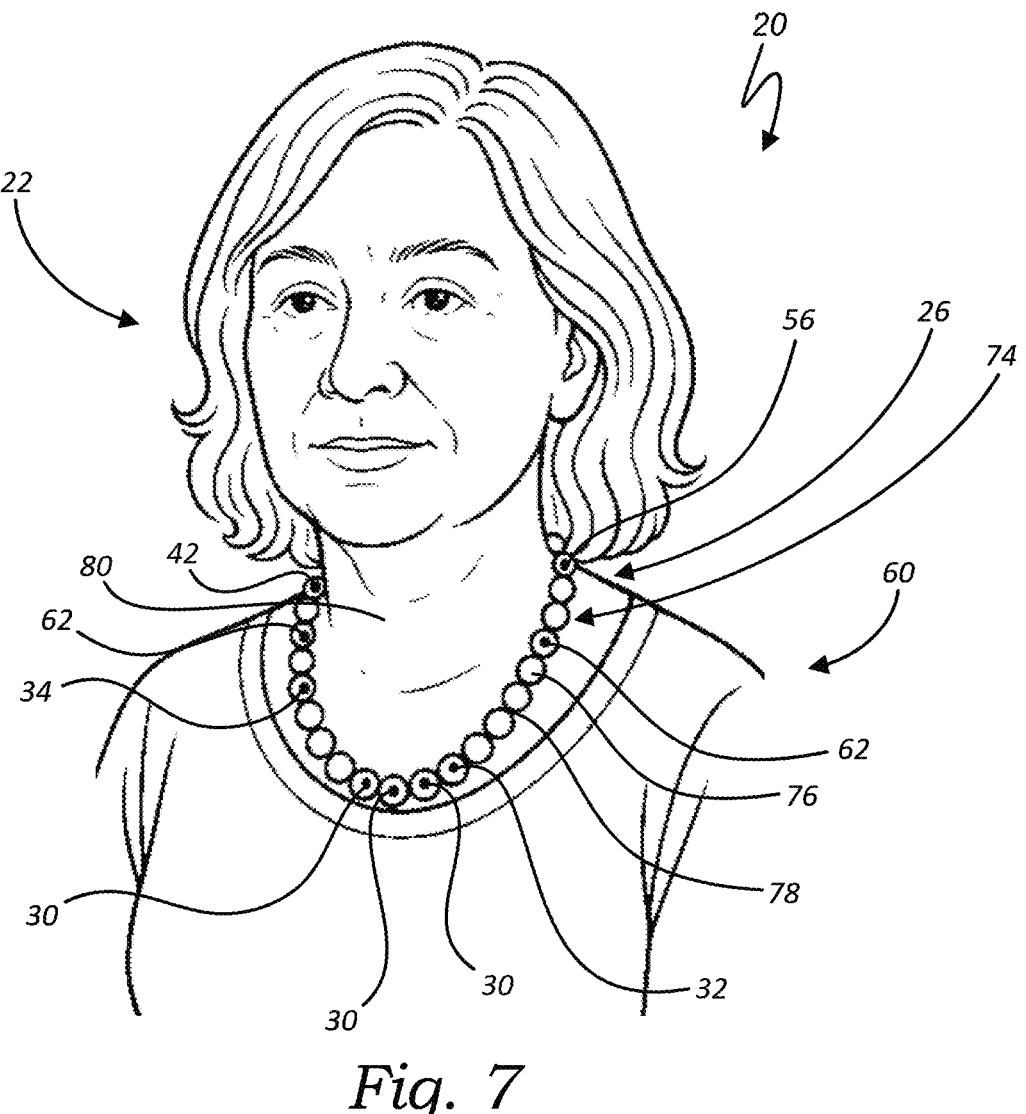
FIG. 7 is a diagrammatic perspective view of a further exemplary adaptive optical obfuscation system integrated with an exemplary wearable accessory, in accordance with at least one embodiment.

In at least one alternate embodiment, the at least one obfuscation device 26 is integrated into a wearable accessory (such as a necklace 74, as depicted in FIG. 7)—such that the object 22 is the wearer 60 of the wearable accessory, and the at least one image sensor 24 may be encountered by the wearer 60 as the wearer 60 moves throughout the surrounding environment. In at least one such embodiment, the necklace 74 may comprise a plurality of individual beads 76 positioned on a length of cord 78 or similar material that engages the necklace 74 around a neck 80 of the wearer 60, with the at least one power source 34 being positioned within at least one of the beads 76, the power port 56 being positioned within another one of the beads 76, the control switch 42 being positioned within another one of the beads 76, the microcontroller 32 being positioned within another one of the beads 76, the at least one activation sensor 62 being positioned within another one of the beads 76, the at least one light emitter 30 being positioned within one or more of the beads 76, and the necessary wiring for electrically interconnecting each of the components being positioned within the cord 78. Additionally, in at least one embodiment, the beads 76 containing one or more of the at least one power source 34, microcontroller 32 and light emitter 30 may incorporate one or more thermal layers 58 that substantially encapsulate said components. However, in further such embodiments, one or more of the components may be positioned elsewhere on the necklace 74.

In at least one further alternate embodiment, the at least one obfuscation device 26 is integrated into a concert, motion picture or theater stage 82 (as depicted in FIG. 8)—such that the object 22 is the stage 82 itself and/or the performer(s) on the stage 82, and the at least one image sensor 24 is in the possession of attendees who might desire to capture unauthorized photos or videos using image sensors 24 (i.e., smartphones, cameras, etc.) during the performance. In at least one such embodiment, one or more obfuscation devices 26 may be positioned on or near the stage 82 (such as along a front edge of the stage 82, for example) such that the at least one light emitter 30 of each obfuscation device 26 is oriented so as to face away from the stage 82, substantially in the direction of the attendees. In at least one alternate embodiment, one or more of the obfuscation devices 26 may be positioned on or near the stage 82 such that the at least one light emitter 30 of each obfuscation device 26 is oriented so as to face toward the stage 82 itself and/or the performer(s) on the stage 82. Additionally, in at least one embodiment, one or more activation sensors 62 may also be positioned on or near the stage 82 (such as along a front edge of the stage 82, for example) such that the at least one activation sensor 62 is oriented so as to face away from the stage 82, substantially in the direction of the attendees. However, in further such embodiments, one or more of the components may be positioned elsewhere relative to the stage 82.

In at least one still further alternate embodiment, the at least one obfuscation device 26 is integrated into a museum exhibit 84 (as depicted in FIG. 9)—such that the at least one object 22 is one or more items on display in the museum exhibit 84, and the at least one image sensor 24 is in the possession of visitors who might desire to capture unauthorized photos or videos of the items on display using image sensors 24 (i.e., smartphones, cameras, etc.) while they are viewing the items. In at least one such embodiment, one or more obfuscation devices 26 may be positioned on or near each of the at least one object 22 such that the at least one light emitter 30 of each obfuscation device 26 is oriented so as to face away from the corresponding at least one object 22, substantially in the direction of the visitors. In at least one alternate embodiment, one or more of the obfuscation devices 26 may be positioned on or near each of the at least one object 22 such that the at least one light emitter 30 of each obfuscation device 26 is oriented so as to face toward the corresponding at least one object 22. Additionally, in at least one embodiment, one or more activation sensors 62 may also be positioned within the museum exhibit 84 (such as at an entrance of the museum exhibit 84, for example) such that the at least one activation sensor 62 is oriented and configured for determining when a given visitor enters the museum exhibit 84. However, in further such embodiments, one or more of the components may be positioned elsewhere relative to the museum exhibit 84 and/or the at least one object 22.

Again, in still further embodiments, the system 20 and its associated components described herein may be configured for use in virtually any context where there is a need for blocking electronic detection and providing visual concealment for an at least one object 22 relative to an at least one image sensor 24—including, but in no way limited to, personal privacy in public settings, protection from surveillance, event and venue control (e.g., motion picture screenings, theatrical performances, musical performances, sporting events, museums, religious facilities, conferences, conventions, confidential environments, private events, etc.), public figure protection, etc. Thus, the system 20 may be configured for flexible integration into wearables, personal accessories, equipment surfaces, structural surfaces, etc. for allowing the emitted light emissions to project toward any potential image sensors 24 and/or the at least one object 22. This physical arrangement enables both targeted and broad-area optical disruption, and supports customization for different use environments, threat models, and privacy needs, without requiring any cooperation from the at least one image sensor 24 or the corresponding device in which the at least one image sensor 24 is integrated. Furthermore, as noted above, the system 20 provides a proactive, hardware-based solution (i.e., operating at the image sensor 24 level) that can prevent real-time image acquisition altogether—rather than known prior art solutions that are merely software-based and reactive (e.g., image blurring or facial masking in post-processing after digital images have already been captured by cameras)—with no reliance on post-processing, device cooperation, firmware modification, or network connectivity. Thus, the system 20 is novel in both its purpose—granting individuals and other objects 22 control over unsolicited image capture—and its method, which combines real-time detection and preemptive image disruption in a form factor suitable for consumer use. The system 20 introduces a new technological category of "personal optical privacy" that does not currently exist in any known commercial or publicly disclosed form.

Aspects of the present specification may also be described as the following embodiments:

1. An adaptive optical obfuscation system configured for blocking electronic detection and providing visual concealment for an at least one object relative to an at least one image sensor, the system comprising: an at least one obfuscation device positioned between the at least one object and the at least one image sensor, the at least one obfuscation device comprising: an at least one light emitter that emits a light emission at a wavelength that approximates a corresponding wavelength utilized by the at least one image sensor so as to create a controlled optical interference field that prevents the at least one image sensor from accurately capturing an image of the at least one light emitter or the at least one object; an at least one microcontroller in electrical communication with the at least one light emitter for controlling the at least one light emitter; and an at least one power source in electrical communication with each of the at least one light emitter and microcontroller for selectively powering each of the at least one light emitter and microcontroller; whereby, the at least one obfuscation device is oriented such that the light emission of the at least one light emitter is directed at one or both of the at least one image sensor and the at least one object.

2. The adaptive optical obfuscation system according to embodiment 1, wherein the at least one obfuscation device further comprises a device housing sized and configured for containing one or more of the at least one light emitter, the at least one microcontroller, and the at least one power source.

3. The adaptive optical obfuscation system according to embodiments 1-2, wherein the device housing of the at least one obfuscation device provides an at least one housing mount positioned and configured for attaching the device housing to a desired location relative to the at least one object.

4. The adaptive optical obfuscation system according to embodiments 1-3, wherein the light emission of the at least one light emitter is at least one of an infrared light and an ultraviolet light.

5. The adaptive optical obfuscation system according to embodiments 1-4, wherein the light emission of the at least one light emitter an infrared light having a wavelength between approximately 700 nanometers and approximately 1 millimeter.

6. The adaptive optical obfuscation system according to embodiments 1-5, wherein the light emission of the at least one light emitter is an infrared light having a wavelength of approximately 780 nanometers.

7. The adaptive optical obfuscation system according to embodiments 1-6, wherein the light emission of the at least one light emitter is an infrared light having a wavelength of approximately 850 nanometers.

8. The adaptive optical obfuscation system according to embodiments 1-7, wherein the light emission of the at least one light emitter is an infrared light having a wavelength of approximately 940 nanometers.

9. The adaptive optical obfuscation system according to embodiments 1-8, wherein the light emission of the at least one light emitter is an ultraviolet light having a wavelength between approximately 100 nanometers and approximately 400 nanometers.

10. The adaptive optical obfuscation system according to embodiments 1-9, wherein the light emission of the at least one light emitter is an ultraviolet light having a wavelength between approximately 365 nanometers and approximately 405 nanometers.

11. The adaptive optical obfuscation system according to embodiments 1-10, wherein the at least one obfuscation device comprises a plurality of light emitters.

12. The adaptive optical obfuscation system according to embodiments 1-11, wherein each of the light emitters are configured for emitting a light emission having substantially the same wavelength.

13. The adaptive optical obfuscation system according to embodiments 1-12, wherein one or more of the light emitters are configured for emitting a light emission having a wavelength that is different from the other of the light emitters.

14. The adaptive optical obfuscation system according to embodiments 1-13, wherein each of the light emitters are configured for emitting a light emission simultaneously.

15. The adaptive optical obfuscation system according to embodiments 1-14, wherein the light emitters are configured for emitting a light emission in one or more pre-defined pulse patterns.

16. The adaptive optical obfuscation system according to embodiments 1-15, wherein an emission intensity of the light emission of the at least one light emitter is between approximately 100 mW/sr and approximately 1 W/sr.

17. The adaptive optical obfuscation system according to embodiments 1-16, wherein an emission intensity of the light emission of the at least one light emitter is less than approximately 100 mW/sr or greater than approximately 1 W/sr.

18. The adaptive optical obfuscation system according to embodiments 1-17, wherein the at least one microcontroller is configured for selectively adjusting the emission intensity of the light emission of the at least one light emitter.

19. The adaptive optical obfuscation system according to embodiments 1-18, wherein the at least one light emitter is configured for emitting the light emission as a substantially cone-shaped emission field, with the emission field having an emission angle of between approximately 30 degrees and approximately 120 degrees relative to the corresponding at least one light emitter.

20. The adaptive optical obfuscation system according to embodiments 1-19, wherein the at least one light emitter is configured for emitting the light emission as a substantially cone-shaped emission field, with the emission field having an emission angle of less than 30 degrees or greater than 120 degrees relative to the corresponding at least one light emitter.

21. The adaptive optical obfuscation system according to embodiments 1-20, wherein the at least one light emitter is configured for allowing selective adjustment of the emission angle.

22. The adaptive optical obfuscation system according to embodiments 1-21, wherein the at least one light emitter provides a micro-lens array or a collimator for selectively adjusting the emission angle.

23. The adaptive optical obfuscation system according to embodiments 1-22, wherein the at least one microcontroller is configured for selectively adjusting the emission angle of the light emission of the at least one light emitter.

24. The adaptive optical obfuscation system according to embodiments 1-23, wherein the at least one obfuscation device further comprises an at least one control switch in electrical communication with the at least one microcontroller for allowing a user to selectively control the at least one light emitter via the at least one microcontroller.

25. The adaptive optical obfuscation system according to embodiments 1-24, further comprising a user application residing locally in memory on a computing device in selective communication with the at least one microcontroller of the at least one obfuscation device, the user application configured for allowing a user to selectively control the at least one light emitter via the at least one microcontroller.

26. The adaptive optical obfuscation system according to embodiments 1-25, wherein the at least one obfuscation device further comprises a transceiver in electrical communication with the at least one microcontroller and in remote communication with the computing device.

27. The adaptive optical obfuscation system according to embodiments 1-26, wherein the at least one power source is an at least one battery.

28. The adaptive optical obfuscation system according to embodiments 1-27, wherein the at least one battery is rechargeable.

29. The adaptive optical obfuscation system according to embodiments 1-28, wherein the at least one obfuscation device further comprises a power port in electrical communication with the at least one battery for charging the at least one battery.

30. The adaptive optical obfuscation system according to embodiments 1-29, wherein the at least one power source is an AC power supply or a DC power supply.

31. The adaptive optical obfuscation system according to embodiments 1-30, wherein the at least one obfuscation device further comprises an at least one thermal layer positioned and configured for absorbing and dissipating any heat generated by one or more of the at least one light emitter, microcontroller and power source.

32. The adaptive optical obfuscation system according to embodiments 1-31, wherein the at least one thermal layer is constructed out of at least one of aluminum, copper, ceramic or carbon nano tubes.

33. The adaptive optical obfuscation system according to embodiments 1-32, further comprising an at least one activation sensor in communication with the at least one microcontroller and configured for assisting the microcontroller with controlling the at least one light emitter.

34. The adaptive optical obfuscation system according to embodiments 1-33, wherein the at least one activation sensor is positioned on or within the at least one obfuscation device.

35. The adaptive optical obfuscation system according to embodiments 1-34, wherein the at least one activation sensor is positioned remote from the at least one obfuscation device.

36. The adaptive optical obfuscation system according to embodiments 1-35, wherein: the at least one activation sensor is positioned and configured for detecting the potential presence of the at least one image sensor oriented in the direction of the at least one object; whereby, upon the at least one activation sensor detecting the presence of the at least one image sensor oriented in the direction of the at least one object, the at least one microcontroller of the at least one obfuscation device activates the corresponding at least one light emitter.

37. The adaptive optical obfuscation system according to embodiments 1-36, wherein the at least one activation sensor is at least one of a photo sensor and a radio frequency detector.

38. The adaptive optical obfuscation system according to embodiments 1-37, wherein the at least one activation sensor is a microbolometer-based thermal sensor.

39. The adaptive optical obfuscation system according to embodiments 1-38, wherein the at least one activation sensor is at least one of a motion sensor and a proximity sensor.

40. The adaptive optical obfuscation system according to embodiments 1-39, wherein: the at least one activation sensor is positioned and configured for detecting the potential presence of movement in the vicinity of the at least one object; whereby, upon the at least one activation sensor detecting the presence of movement in the vicinity of the at least one object, the at least one microcontroller of the at least one obfuscation device activates the corresponding at least one light emitter.

41. An adaptive optical obfuscation system configured for blocking electronic detection and providing visual concealment for an at least one object relative to an at least one image sensor, the system comprising: an at least one obfuscation device positioned between the at least one object and the at least one image sensor, the at least one obfuscation device comprising: a device housing; an at least one light emitter positioned on or within the device housing and configured for emitting a light emission at a wavelength that approximates a corresponding wavelength utilized by the at least one image sensor so as to create a controlled optical interference field that prevents the at least one image sensor from accurately capturing an image of the at least one light emitter or the at least one object; an at least one microcontroller positioned within the device housing and in electrical communication with the at least one light emitter for controlling the at least one light emitter; and an at least one power source positioned within the device housing and in electrical communication with each of the at least one light emitter and microcontroller for selectively powering each of the at least one light emitter and microcontroller; whereby, the at least one obfuscation device is oriented such that the light emission of the at least one light emitter is directed at one or both of the at least one image sensor and the at least one object.

42. An adaptive optical obfuscation system configured for blocking electronic detection and providing visual concealment for an at least one object relative to an at least one image sensor, the system comprising: an at least one obfuscation device positioned between the at least one object and the at least one image sensor, the at least one obfuscation device comprising: an at least one light emitter that emits a light emission at a wavelength that approximates a corresponding wavelength utilized by the at least one image sensor so as to create a controlled optical interference field that prevents the at least one image sensor from accurately capturing an image of the at least one light emitter or the at least one object; an at least one microcontroller in electrical communication with the at least one light emitter for controlling the at least one light emitter; and an at least one power source in electrical communication with each of the at least one light emitter and microcontroller for selectively powering each of the at least one light emitter and microcontroller; an at least one activation sensor in communication with the at least one microcontroller and configured for assisting the microcontroller with controlling the at least one light emitter; and the at least one activation sensor being at least one of a photo sensor and a radio frequency detector configured for detecting the potential presence of the at least one image sensor oriented in the direction of the at least one object; whereby, with the at least one obfuscation device oriented such that the light emission of the at least one light emitter is directed at one or both of the at least one image sensor and the at least one object, upon the at least one activation sensor detecting the presence of the at least one image sensor oriented in the direction of the at least one object, the at least one microcontroller of the at least one obfuscation device activates the corresponding at least one light emitter.

In closing, regarding the exemplary embodiments of the present invention as shown and described herein, it will be appreciated that an adaptive optical obfuscation system is disclosed and configured for blocking electronic detection and providing visual concealment for an at least one object relative to an at least one image sensor. Because the principles of the invention may be practiced in a number of configurations beyond those shown and described, it is to be understood that the invention is not in any way limited by the exemplary embodiments, but is generally directed to an adaptive optical obfuscation system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any logic code, programs, modules, processes, and/or methods disclosed herein, along with the order in which the respective elements of any such method are performed, are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived." The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

All of the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. An adaptive optical obfuscation system configured for blocking electronic detection and providing visual concealment for an at least one object relative to an at least one image sensor, the system comprising:

an at least one obfuscation device positioned between the at least one object and the at least one image sensor, the at least one obfuscation device comprising:

an at least one light emitter that emits a light emission at a wavelength that approximates a corresponding wavelength utilized by the at least one image sensor so as to create a controlled optical interference field that prevents the at least one image sensor from accurately capturing an image of the at least one light emitter or the at least one object;

an at least one microcontroller in electrical communication with the at least one light emitter for controlling the at least one light emitter; and an at least one power source in electrical communication with each of the at least one light emitter and microcontroller for selectively powering each of the at least one light emitter and microcontroller;

whereby, the at least one obfuscation device is oriented such that the light emission of the at least one light emitter is directed at one or both of the at least one image sensor and the at least one object.

2. The adaptive optical obfuscation system of claim 1, wherein the at least one obfuscation device further comprises a device housing sized and configured for containing one or more of the at least one light emitter, the at least one microcontroller, and the at least one power source.

3. The adaptive optical obfuscation system of claim 1, wherein the light emission of the at least one light emitter is at least one of an infrared light and an ultraviolet light.

4. The adaptive optical obfuscation system of claim 3, wherein the light emission of the at least one light emitter is an infrared light having a wavelength between approximately 700 nanometers and approximately 1 millimeter.

5. The adaptive optical obfuscation system of claim 4, wherein the light emission of the at least one light emitter is an ultraviolet light having a wavelength between approximately 100 nanometers and approximately 400 nanometers.

6. The adaptive optical obfuscation system of claim 1, wherein the at least one obfuscation device comprises a plurality of light emitters.

7. The adaptive optical obfuscation system of claim 6, wherein one or more of the light emitters are configured for emitting a light emission having a wavelength that is different from the other of the light emitters.

8. The adaptive optical obfuscation system of claim 6, wherein the light emitters are configured for emitting a light emission in one or more pre-defined pulse patterns.

9. The adaptive optical obfuscation system of claim 1, wherein an emission intensity of the light emission of the at least one light emitter is between approximately 100 mW/sr and approximately 1 W/sr.

10. The adaptive optical obfuscation system of claim 9, wherein the at least one microcontroller is configured for selectively adjusting the emission intensity of the light emission of the at least one light emitter.

11. The adaptive optical obfuscation system of claim 1, wherein the at least one light emitter is configured for emitting the light emission as a substantially cone-shaped emission field, with the emission field having an emission angle of between approximately 30 degrees and approximately 120 degrees relative to the corresponding at least one light emitter.

12. The adaptive optical obfuscation system of claim 11, wherein the at least one microcontroller is configured for selectively adjusting the emission angle of the light emission of the at least one light emitter.

13. The adaptive optical obfuscation system of claim 12, wherein the at least one light emitter provides a micro-lens array or a collimator for selectively adjusting the emission angle.

14. The adaptive optical obfuscation system of claim 1, wherein the at least one obfuscation device further comprises an at least one control switch in electrical communication with the at least one microcontroller for allowing a user to selectively control the at least one light emitter via the at least one microcontroller.

15. The adaptive optical obfuscation system of claim 1, wherein the at least one obfuscation device further comprises an at least one thermal layer positioned and configured for absorbing and dissipating any heat generated by one or more of the at least one light emitter, microcontroller and power source.

16. The adaptive optical obfuscation system of claim 1, further comprising an at least one activation sensor in communication with the at least one microcontroller and configured for assisting the microcontroller with controlling the at least one light emitter.

17. The adaptive optical obfuscation system of claim 16, wherein:
  the at least one activation sensor is positioned and configured for detecting the potential presence of the at least one image sensor oriented in the direction of the at least one object;

whereby, upon the at least one activation sensor detecting the presence of the at least one image sensor oriented in the direction of the at least one object, the at least one microcontroller of the at least one obfuscation device activates the corresponding at least one light emitter.

18. The adaptive optical obfuscation system of claim 17, wherein the at least one activation sensor is at least one of a photo sensor and a radio frequency detector.

19. An adaptive optical obfuscation system configured for blocking electronic detection and providing visual concealment for an at least one object relative to an at least one image sensor, the system comprising:
  an at least one obfuscation device positioned between the at least one object and the at least one image sensor, the at least one obfuscation device comprising:
    a device housing;
    an at least one light emitter positioned on or within the device housing and configured for emitting a light emission at a wavelength that approximates a corresponding wavelength utilized by the at least one image sensor so as to create a controlled optical interference field that prevents the at least one image sensor from accurately capturing an image of the at least one light emitter or the at least one object;
    an at least one microcontroller positioned within the device housing and in electrical communication with the at least one light emitter for controlling the at least one light emitter; and
    an at least one power source positioned within the device housing and in electrical communication with each of the at least one light emitter and microcontroller for selectively powering each of the at least one light emitter and microcontroller;
  whereby, the at least one obfuscation device is oriented such that the light emission of the at least one light emitter is directed at one or both of the at least one image sensor and the at least one object.

20. An adaptive optical obfuscation system configured for blocking electronic detection and providing visual concealment for an at least one object relative to an at least one image sensor, the system comprising:
  an at least one obfuscation device positioned between the at least one object and the at least one image sensor, the at least one obfuscation device comprising:
    an at least one light emitter that emits a light emission at a wavelength that approximates a corresponding wavelength utilized by the at least one image sensor so as to create a controlled optical interference field that prevents the at least one image sensor from accurately capturing an image of the at least one light emitter or the at least one object;
    an at least one microcontroller in electrical communication with the at least one light emitter for controlling the at least one light emitter; and
    an at least one power source in electrical communication with each of the at least one light emitter and microcontroller for selectively powering each of the at least one light emitter and microcontroller;
  an at least one activation sensor in communication with the at least one microcontroller and configured for assisting the microcontroller with controlling the at least one light emitter; and
  the at least one activation sensor being at least one of a photo sensor and a radio frequency detector configured for detecting the potential presence of the at least one image sensor oriented in the direction of the at least one object;

whereby, with the at least one obfuscation device oriented such that the light emission of the at least one light emitter is directed at one or both of the at least one image sensor and the at least one object, upon the at least one activation sensor detecting the presence of the at least one image sensor oriented in the direction of the at least one object, the at least one microcontroller of the at least one obfuscation device activates the corresponding at least one light emitter.

\* \* \* \* \*